United States Patent [19]

Chikada

[11] Patent Number: 5,446,631
[45] Date of Patent: Aug. 29, 1995

[54] DEVICE FOR CONFIRMING OPTICAL-AXIS ADJUSTMENT OF AUTOMOTIVE HEADLAMP

[75] Inventor: Akira Chikada, Isehara, Japan

[73] Assignee: Ichikoh Industries, Inc., Tokyo, Japan

[21] Appl. No.: 174,540

[22] Filed: Dec. 28, 1993

[30] Foreign Application Priority Data

Dec. 28, 1992 [JP] Japan .............................. 4-089166 U

[51] Int. Cl.6 .............................................. B60Q 1/06
[52] U.S. Cl. ...................................... 362/66; 362/269; 362/287; 362/418
[58] Field of Search ................... 362/61, 66, 269, 271, 362/287, 418, 419

[56] References Cited

U.S. PATENT DOCUMENTS

| | | | |
|---|---|---|---|
| 5,032,964 | 7/1991 | Endo et al. ............................ | 362/61 |
| 5,055,980 | 10/1991 | Mochizuki ............................ | 362/61 |
| 5,063,480 | 11/1991 | McMahan et al. ................... | 362/61 |
| 5,065,293 | 11/1991 | Mochizuki ............................ | 362/61 |
| 5,067,056 | 11/1991 | Suzuki et al. ........................ | 362/419 |
| 5,138,532 | 8/1992 | Shirai et al. .......................... | 362/66 |
| 5,150,958 | 9/1992 | Miyazawa et al. .................. | 362/66 |

FOREIGN PATENT DOCUMENTS 4-24210 2/1992 Japan .

*Primary Examiner*—Ira S. Lazarus
*Assistant Examiner*—L. Heyman
*Attorney, Agent, or Firm*—Foley & Lardner

[57] ABSTRACT

The device for confirming the adjustment of the optical axis of an automotive headlamp comprises a case fixed to a lamp housing of the headlamp, a rod of which the rear-end portion one end is located inside the case while the front end is inserted through a hole in the lamp housing and fixed to the reflector of the headlamp, the case having an index marked thereon and the rod also having a scale marked thereon, and a protective cover having a window for viewing the index and scale from outside and which is destined to protect, against external shock, the case and rod both projecting out of the lamp housing.

5 Claims, 7 Drawing Sheets

DEVICE FOR CONFIRMING OPTICAL-AXIS ADJUSTMENT OF AUTOMOTIVE HEADLAMP

BACKGROUND OF THE INVENTION a) Field of the Invention

The present invention relates to a device for confirming the adjustment of an automotive headlamp optical axis, and more particularly, to a device for confirming the optical-axis adjustment of an automotive headlamp, adapted to confirm mainly the horizontal adjustment of optical axis by checking the movement of a rod fixed to a reflector of the headlamp in relation to a case fixed to a lamp housing of the headlamp, and provided with a means of protecting the case and rod against any external shock, for example, such as a pebble flying from outside during driving of the car or tool dropped by mistake during a car servicing.

b) Prior-art Statement

If directed too far upward, a headlamp will provide a light beam which is likely to dazzle the driver of a car running in the opposite lane, possibly causing a danger. On the contrary, if the headlamp is directed too far downward, the headlamp will not provide sufficient illumination of the road surface in front of the car for assurance of safe driving visibility. Also, if directed excessively to the right or left of the car, the headlamp will not illuminate the road surface sufficiently. Hence, the automotive headlamp has to be equipped with devices for fine vertical and horizontal adjustment, respectively, of the optical axis of the headlamp actually installed on a car.

A typical one of the automotive headlamps of this type is known from the disclosure in U.S. Pat. No. 5,055,980, in which a reflector is pivotably mounted inside a lamp housing of the headlamp by means of a pivot bearing, a lamp bulb assembly is fixed to the reflector and vertical and horizontal optical-axis adjusters for the headlamp are fixed to the reflector and lamp housing. These vertical and horizontal optical-axis adjusters are used to pivot the reflector vertically and horizontally in relation to the lamp housing, thereby adjusting the headlamp optical axis vertically and horizontally.

The direction of the headlamp optical axis must be adjusted with a high accuracy but cannot easily be adjusted except by a specialist using a special facility. Before a car is shipped from the automobile manufacturing facility or when the headlamps are equipped on a car at a service shop, the direction of the headlamp optical axis is adjusted by a specialist using a dedicated adjusting facility. However, the optical axis of the can headlamp, found deviated from its due direction for any reason after adjusted at such works or shop, must be readjusted.

In this case, some reference is available for such readjustment. Namely, if the optical axis of the headlamp has already been adjusted accurately, it can be readjusted without any specialist and special facility by reproducing its initially adjusted state. For this purpose, there have so far been proposed and used various types of optical-axis adjustment confirming devices (more specifically, devices for confirming whether or not the initially adjusted state of the optical axis has been reproduced).

A typical one of the devices for confirming mainly the horizontal adjustment of headlamp optical axis is known from the disclosure in the Japanese Unexamined Utility Model Publication No. Hei 4-24210, in which a hollow cylindrical case, open at one end thereof and closed at the other end and made of a transparent material through which the interior can be viewed, is fixed at the one-end (open) portion thereof at the edge of a through-hole in the lamp housing of an automotive headlamp in such a manner that it can initially be set, the other-end (closed) portion of the case being projected of the lamp housing; a rod is provided which is fixed at one end thereof to the reflector of the headlamp and inserted at the other-end portion thereof into the case from the open end of thereof; and the rod has marked on the other-end portion thereof a scale which faces an index on the case so that a displacement of the rod caused by a pivoting of the reflector can be read as a measure for adjustment of the optical axis.

The optical-axis adjuster is used to pivot the reflector with respect to the lamp housing, thereby adjusting the optical axis of the headlamp vertically or horizontally. As the reflector is pivoted, the rod is moved correspondingly. The moving distance of the rod is read as an adjustment of the headlamp optical axis by checking the displacement of the scale on the rod in relation to the index on the case. For this reading, it is assumed for example that the pivot angle of the reflector is 0.38° when the displacement of the index by one graduation of the scale on the rod is 1.5 mm.

In such a device for confirmation of the optical axis adjustment, the rod is inserted axially movably in the case. So the rod is thin and mechanically weak. Since the case is fixed to the lamp housing so as to be initially settable, it has no sufficient rigidity against an external shock.

In the aforementioned optical-axis adjustment confirming device, however, the case, the rod, etc., are exposed outside the lamp housing and any protective means is not provided against external shock. The optical-axis adjustment confirming device will possibly be broken if given an external shock such as a tool dropped by mistake or a pebble flying from the road.

SUMMARY OF THE INVENTION

The present invention has an object to overcome the above-mentioned drawbacks of the prior art by providing a device for confirming the optical-axis adjustment of an automotive headlamp, which can be protected against an external shock, etc. (hitting by a foreign matter such as pebble or the like flying from outside or a tool dropped by mistake during car servicing).

The above object is attained by providing a device for confirming the optical-axis adjustment of an automotive headlamp, comprising a case, rod, etc. of which the portions projecting out of a lamp housing of the headlamp are covered with a protective cover. Thus, the protective cover can positively protect the case, rod, etc. of the device, projecting out of the lamp housing, against any external shock.

DETAILED DESCRIPTION OF THE PREFERRED EMBODIMENTS

Figure 1:
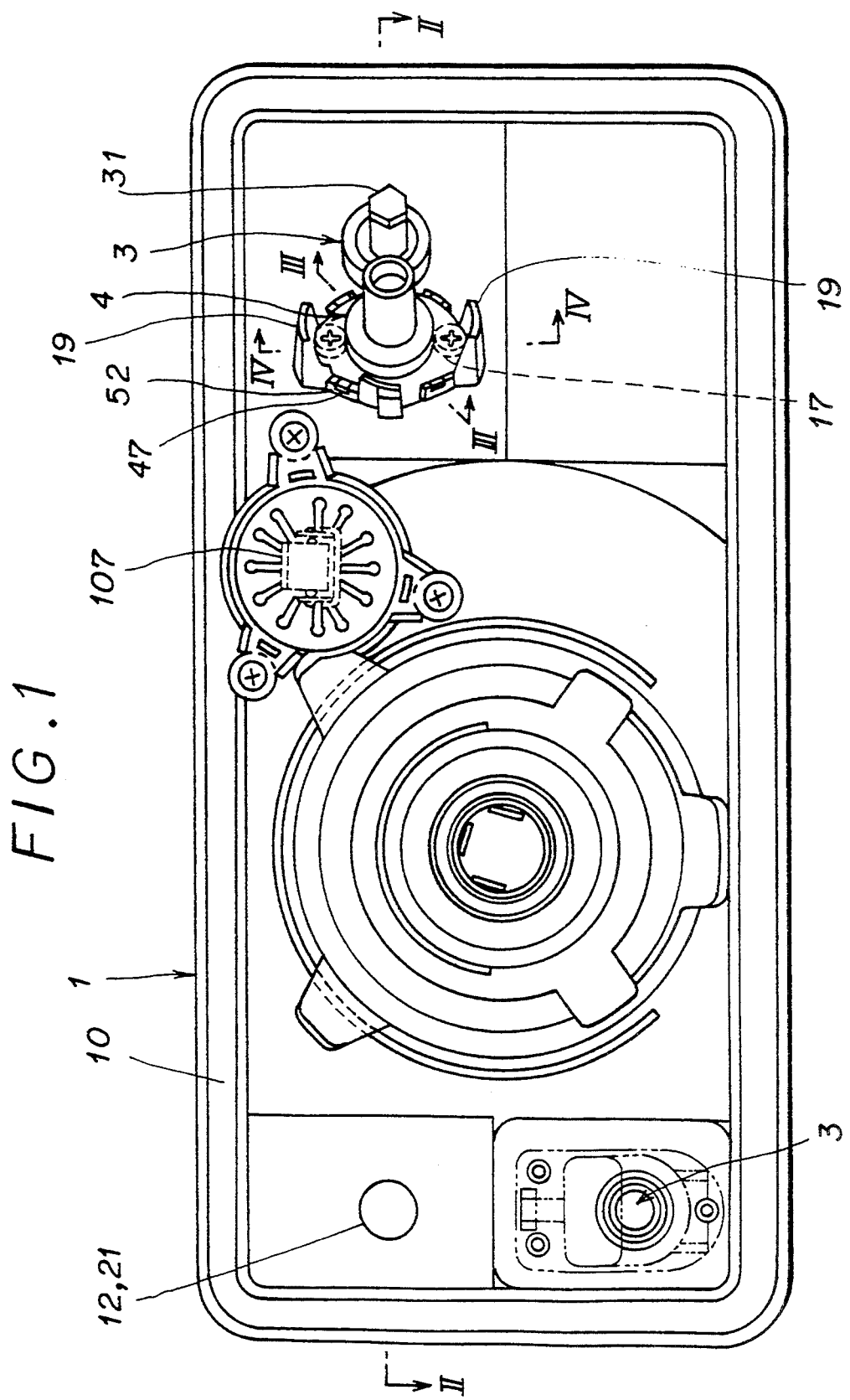
FIG. 1 is a rear view of an automotive headlamp provided with the device for confirming the optical-axis adjustment according to the present invention.
Figure 2:
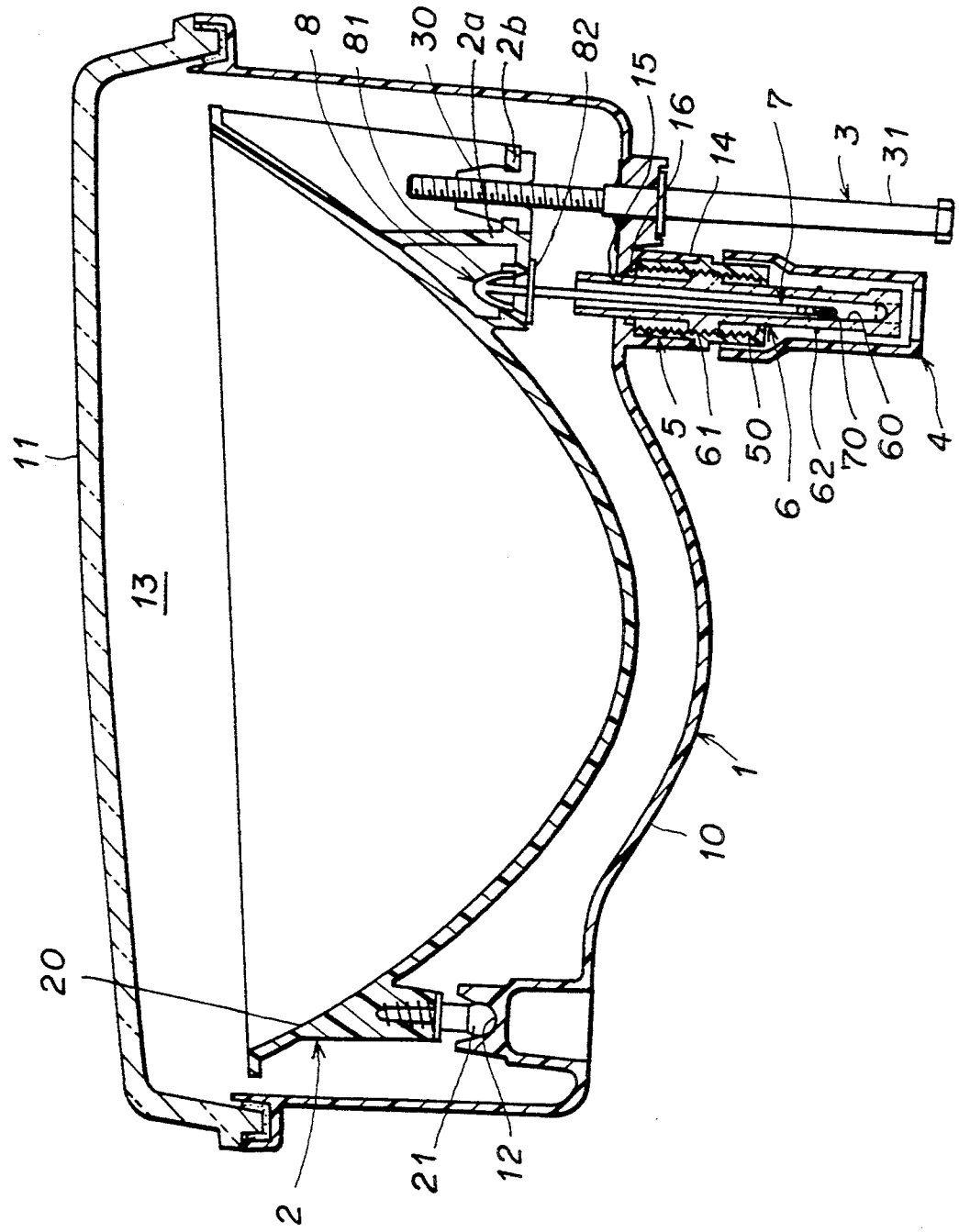
FIG. 2 is a sectional view taken along the line II—II in FIG. 1.

In FIGS. 1 and 2, the reference numeral I denotes an automotive headlamp, which is to be installed to a car body. As shown in FIG. 2, the headlamp 1 comprises a lamp housing 10 having a front lens 11 fixed over the front opening of the lamp housing. The lamp housing 10 and lens 11 define together a lamp bulb enclosure 13. The lamp housing 10 has formed on the inner face thereof a bearing 12 in which a spherical concavity is formed. The reference numeral 2 denotes a reflector of the headlamp 1, which is provided as pivotably supported in the lamp bulb enclosure 13. As seen from FIG. 2, the reflector 2 has formed on the front side thereof a reflecting surface 20 having the form of, for example, a paraboloid of revolution. The reflector 2 has also a ball-headed shaft 21 studded at the back thereof. The ball head of the shaft 21 of the reflector 2 is pivotably fitted in the bearing 12 of the housing 10. Thus, the reflector 2 is pivotable vertically or horizontally. Note that a lamp bulb (not shown) is disposed at the front side of the reflector 2.

The reference numeral 3 denotes an optical-axis adjuster. As seen in FIG. 2, the optical-axis adjuster 3 consists of a screw mount 30 and an adjusting screw 31. The reflector 2 has formed integrally on the rear side thereof a projecting mount 2a with a vertical wall 2b having formed therein a through-hole in which the screw mount 30 is fitted in such a manner that it is neither pivotable nor movable axially of the adjusting screw 31. The adjusting screw 31 is fitted rotatably but not axially movably in a through-hole formed adjacent to the boss 14 to which the optical-axis adjuster 3 is installed. The adjusting screw 31 is screwed in the screw mount 30. By rotating the adjusting screw 31, the reflector 2 is vertically or horizontally pivoted by means of the screw mount 30, thereby adjusting the optical axis of the headlamp 1. The optical-axis adjuster 2 shown in FIG. 3 is intended for adjusting the headlamp optical axis horizontally.

The reference numeral 107 in FIG. 1 denotes a device for confirmation of the vertical adjustment of the optical axis, which uses a level or the like.

Figure 3:
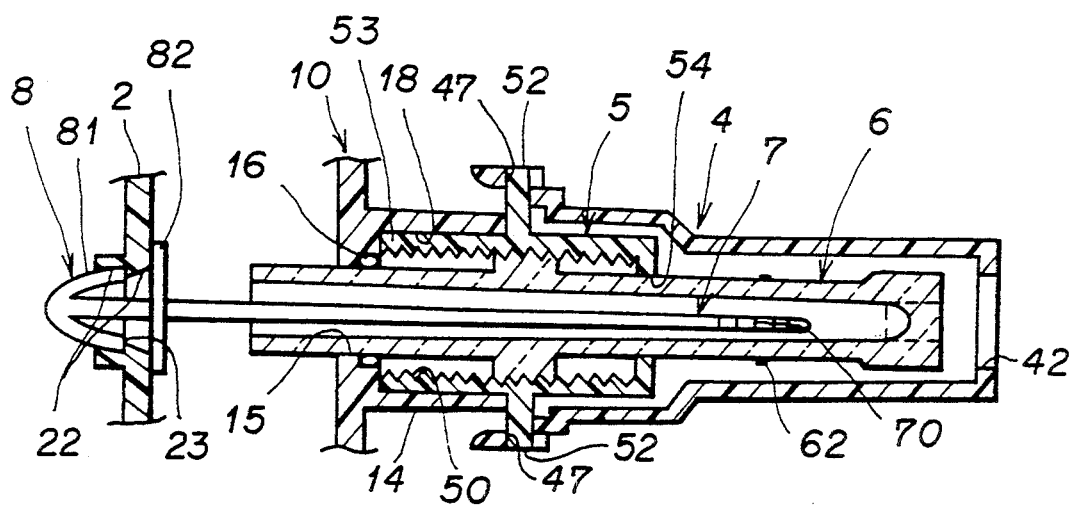
FIG. 3 is a sectional view taken along the line III—III in FIG. 1.
Figure 4:
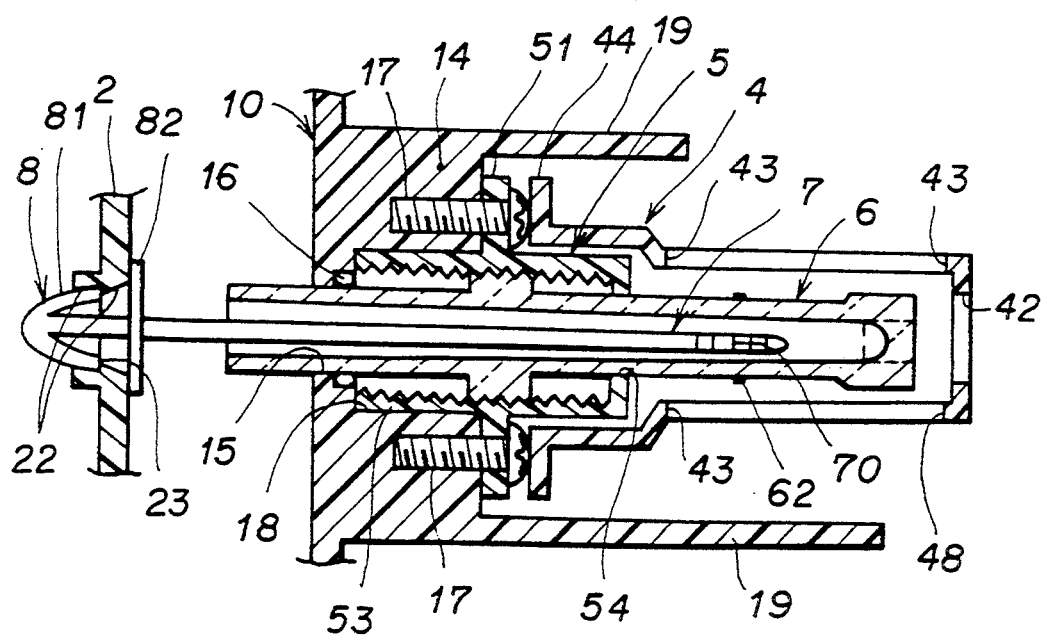
FIG. 4 is a sectional view taken along the line IV—IV in FIG. 1.
Figure 5:
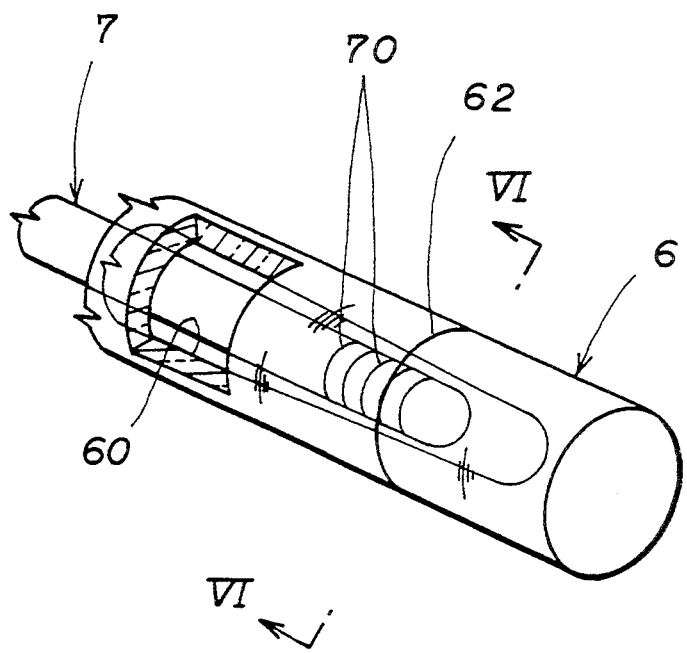
FIG. 5 is a fragmentary perspective view of the case and rod.
Figure 6:
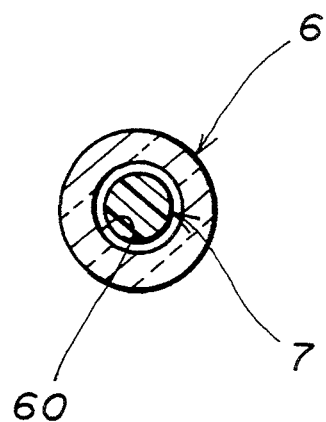
FIG. 6 is a sectional view taken along the line VI—VI in FIG. 5.
Figure 7:
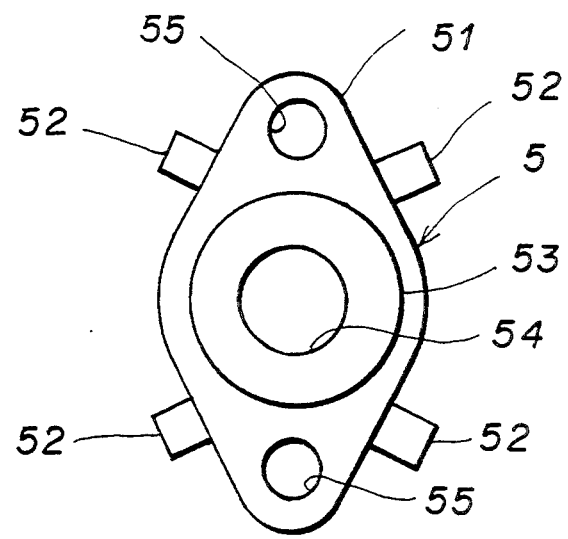
FIG. 7 is a rear view of the fixing member.
Figure 8:
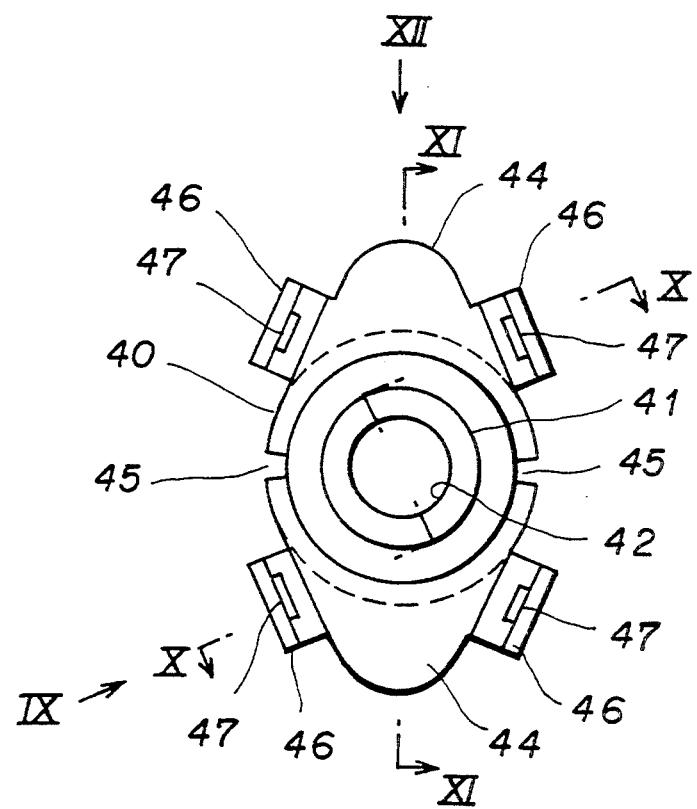
FIG. 8 is a rear view of the protective cover.
Figure 9:
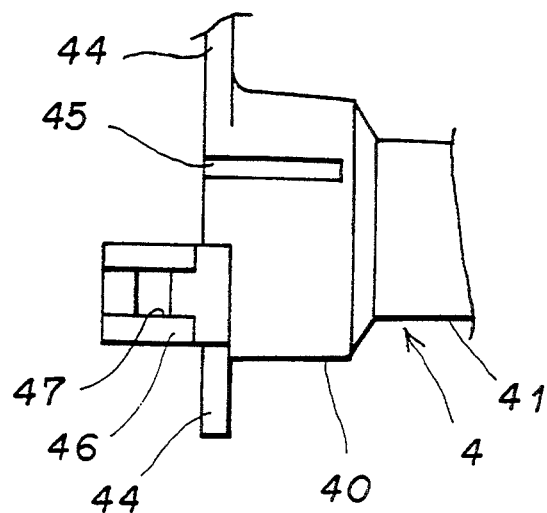
FIG. 9 is a view from the arrow IX in FIG. 8.
Figure 10:
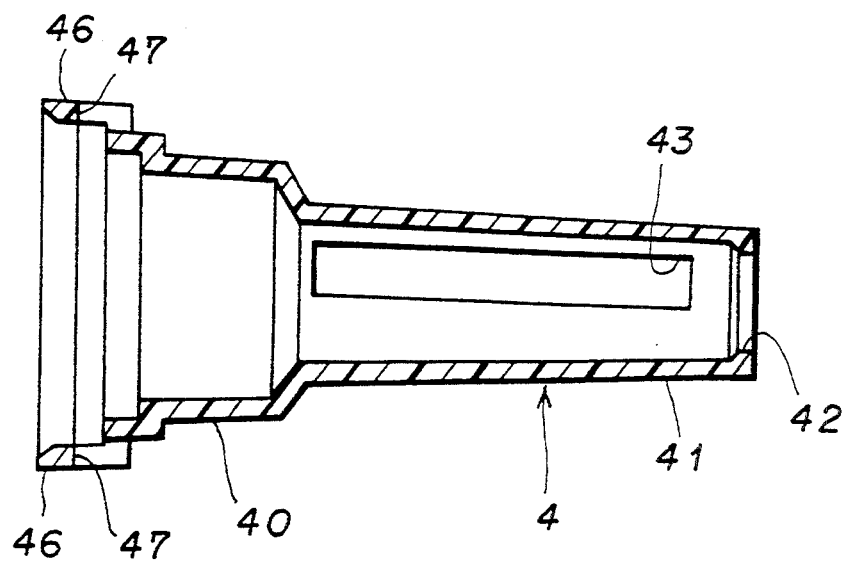
FIG. 10 is a sectional view taken along the line X—X in FIG. 8.
Figure 11:
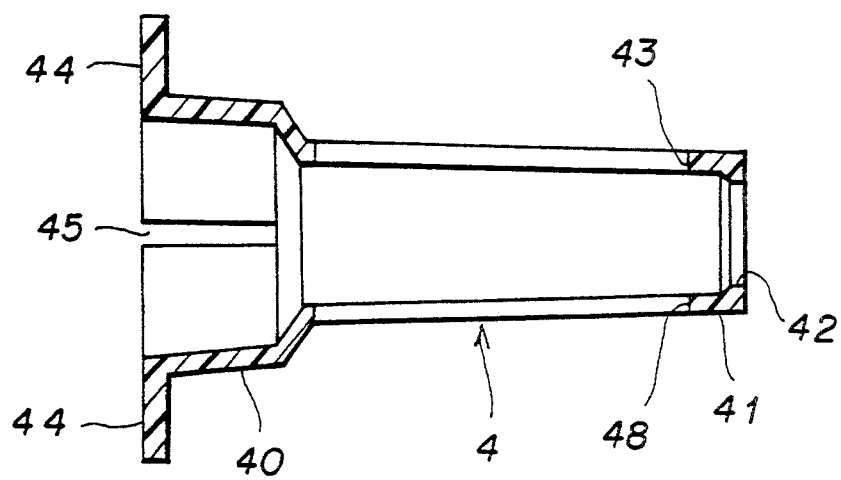
FIG. 11 is a sectional view taken along the line XI—XI in FIG. 8.
Figure 12:
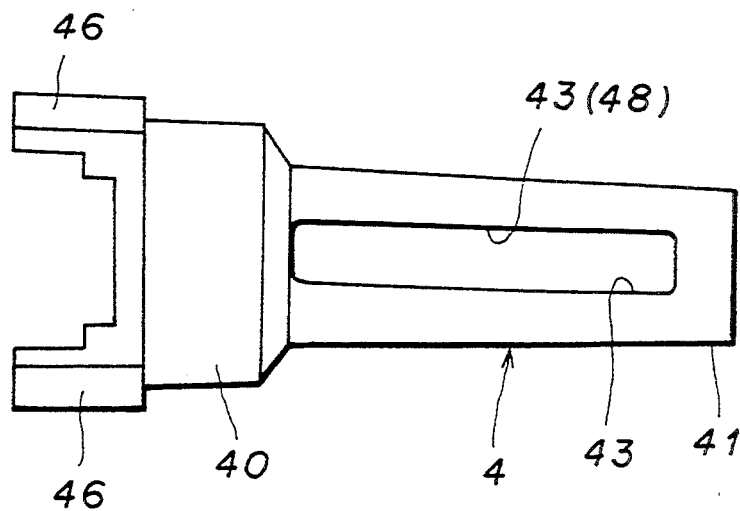
FIG. 12 is a view from the arrow XII in FIG. 8.

As shown in FIGS. 2 to 4, a boss 14 (generally lozenge-shaped with corners rounded) for installation of the device for confirming the optical-axis adjustment is formed integrally at a portion of the lamp housing 10, adjacent to the optical-axis adjuster 3. The boss 14 has a through-hole 15 and a concavity 18 in the center thereof. Flanges 19 are formed integrally at the top and bottom, respectively, of the boss 14. The lower one of these flanges 19 is longer than the upper one. An engagement hole 22 for installation of the device for confirmation of the optical-axis adjustment, is formed at the mount 2a in a place on the opposite side to the reflecting surface 20 of the reflector 2, adjacent to the optical-axis adjusting device 3 and also opposite to the boss 14, its through-hole 15 and concavity 18 at the lamp housing 10. The engagement hole 22 has an engagement step 23 formed nearly in the middle of the lower half of the vertical wall 2b of the mount 2a. The through-hole 22 consists of a front portion of which the inside diameter remains unchanged all the way from the step 23 toward the front and a rear portion (portion at the side of the lamp housing 10) of which the inside diameter becomes gradually smaller from the rear end toward front end thereof. Namely, the through-hole 22 is so shaped that a clip 8 of the rod 7, which will be discussed later, can easily be force-fitted therein.

The reference numeral 5 denotes a fixing member. As shown in FIGS. 2 to 4 and 7, the fixing member 5 consists of a cylindrical portion 53, a flange portion 51 (having a generally same shape (lozenge) with the corners rounded as the boss 14 of the lamp housing 10) formed integrally with, and projected, from nearly the middle of the outer circumference of the cylindrical portion 53, and four engagement pawls 52 formed integrally nearly in the middles of four outer sides, respectively, of the flange 51. The cylindrical portion 53 is internally threaded at 50 and has a small-circular through-hole 54 formed in the rear end thereof. The flange portion 51 has formed at the upper and lower portions thereof small-circular through-holes 55, respectively, through which screws 17 are to be inserted, respectively. The front end of the cylindrical portion 53 of the fixing member 5 is inserted into the concavity 18 in the boss 14 of the lamp housing 10, while the flange portion 51 of the fixing member 5 is secured to the boss 14 of the lamp housing with the screws 17, thereby fixing the fixing member 5 to the lamp housing 10.

The reference numeral 6 denotes a case having the form of a tube open at one end thereof and closed at the other end as shown in FIGS. 2 to 6. The case 6 is made of a transparent material so that the case inside can be viewed from outside. Also the case 6 has formed therein a bore 60 open at the one end of the case 6, extending from the one end toward the other end. The case 6 has a thread 61 formed on the outer circumference nearly at the intermediate portion thereof. An index 62 is marked circumferentially on the outer circumference of the other-end portion of the case 6. The one-end and intermediate portions of the case 6 are inserted rotatably and axially movably into the through-hole 15 of the lamp housing 10 and through-hole 54 of the fixing member 5, respectively, while the thread portion 61 of the case 6 is screwed into the threaded bore 50 of the fixing member 5. Thus, the case 6 is installed movably axially thereof and also of the rod 7 to the lamp housing 10 (namely, the headlamp 1).

The reference numeral 7 denotes a rod. The rod 7 has a front portion at which it is fixed to the reflector 2 and a rear portion which is to extend in the bore 60 of the case 6 as shown in FIGS. 2 to 6. The rod 7 is made of an elastic synthetic resin such as nylon or the like, which varies little in axial length with any temperature variation and restores its normal state immediately after being forcibly deformed. The rod 6 has provided circumferentially on the other-end portion thereof a scale 70 having regularly spaced graduations marked with a paint or the like.

The reference numeral 8 denotes a clip formed integrally at the one-end of the rod 7. As shown in FIGS. 2 to 4, the clip 8 consists of an arrowhead-like elastic hook portion 81 and an immobilizing flange portion 82.

The rod 7 is inserted at the one end thereof from the opening at the one-end of the case 6 into the bore 60 of the case 6. On the other hand, the elastic hook portion 81 of the clip 8 of the rod 7 is force-fitted into the engagement hole 22 in the vertical wall 2b of the mount 2a of the reflector 2 and elastically engaged on the step 23 of the engagement hole 22, while the immobilizing flange 82 of the clip 8 is made to abut the circumferential edge at the rear side of the engagement hole 22 in the vertical wall 2b of the mount 2a. That is, the elastic hook portion 81 and immobilizing flange 82 of the clip 8 will catch, between them, the front and rear circumferential edges of the engagement hole 22 in the vertical wall 2b of the mount 2a of the reflector 2. Thus, the rod 7 is installed at the one end thereof to the reflector 2 by means of the clip 8.

After fixing the rod 7 to the reflector 2, the case 6 is rotated to move axially into the fixing member 5 until the index 62 on the case 6 coincides with the reference one, for example, the graduation 0 (zero), of the graduations of the scale 70 on the rod 7. This is the initial setting of the device for confirming the optical-axis adjustment.

Then, the optical-axis adjuster 3 is operated to pivot the reflector 2 with respect to the lamp housing 10, thereby adjusting the optical axis of the headlamp 1. As the reflector 2 is pivoted horizontally, the rod 7 is moved by means of the clip 8. The moving distance of the rod 7 is read as an adjustment of the headlamp optical axis by checking the displacement of the scale 70 on the rod 7 in relation to the index 62 on the case 6. For this reading, it is assumed for example that the pivot angle of the reflector 2 is 0.38° when the displacement of the index by one graduation of the scale 70 on the rod 7 is 1.5 mm.

Note that the fixation of the rod 7 to the reflector 2 is not only limited to the aforementioned clip 8. A magnet or spring may be used instead of the clip 8.

The reference numeral 4 denotes a protective cover. The protective cover 4 is made of a rigid synthetic resin, a metal or the like. As shown in FIGS. 8 to 12, the protective cover 4 has the form of a hollow cylinder consisting of a large-diameter cylindrical portion 40 and a small-diameter cylindrical portion 41. The protective cover 4 is open at the one end of the large-diameter cylindrical portion 40 and has a lighting through-hole 42 formed in the other end thereof (at the rear end of the small-diameter portion 41).

The inside diameter of the small-diameter cylindrical portion 41 is somewhat larger than the outside diameter of the case 6. The small-diameter cylindrical portion 41 has a viewing window 43 formed axially on the side thereof at which the index 62 marked on the case 6 and the scale 70 marked on the rod 7 are to be viewed, and a lighting window 48 formed axially therein in a position opposite to the viewing window 43.

The inside diameter of the large-diameter cylindrical portion 40 is a little larger than the outside diameter of the fixing member 5. A flange 44 is formed integrally at the opening edge of the large-diameter cylindrical portion 40. The flange 44 has nearly a same size as the boss 14 of the lamp housing 10 and the flange portion 51 of the fixing member 5, and is generally lozenge-shaped with the corners rounded. Two cuts 45 opposite to each other are axially formed on both the right and left sides (nearly perpendicular to the windows 43 and 48 in the small-diameter cylindrical portion 41) of the large-diameter cylindrical portion 40. Four drooping pieces 46 are formed integrally at the edges, respectively, of the flange 44 of the large-diameter cylindrical portion 40, the edges being directed at about 45° with respect to the windows 43 and 48 in the small-diameter cylindrical portion 41 and the cuts 45 in the large-diameter cylindrical portion 40. In each of the drooping pieces 46, an engagement hole 47 is formed correspondingly to the engagement pawl 52. The inner surface of the drooping piece 36 is slanted, and the engagement hole 47 is formed at the junction between the open end of the large-diameter cylindrical portion 40 and the upper portion of the drooping piece 46 after the molding die is removed.

The protective cover 4 is installed to cover the optical-axis adjustment confirming device consisting of the fixing member 5, case 6, rod 7, etc. and the engagement pawl 52 of the fixing member 5 is fitted in the engagement hole 47 in the protective cover 4. At this time, the engagement pawl 52 is elastically engaged in the engagement hole 47 in a positive manner owing to the resilience of the drooping pieces 46 of the protective cover 4. The flange 44 of the protective cover 4 is made to abut the heads of the screws 17 which fix the flange portion 51 of the fixing member 5 to the lamp housing 10.

In the device for confirming the adjustment of headlamp optical axis according to the present invention, the protective cover 4 covers the components of the device such as the fixing member 5, case 6, rod 7, etc. so that the components can be positively protected against any external shock.

In this embodiment, the protective cover 4 has the viewing window 43 formed on the side thereof at which the index 62 marked on the case 6 and the scale 70 marked on the rod 7 are to be viewed, and the lighting window 48 formed therein in a position opposite to the viewing window 43. Therefore, any refracted light or irregularly reflected light or the like (glaring light) incident upon the index 62 on the case 6 and scale 70 on the rod, can be cut off so that the index 62 and scale 70 can easily be viewed.

The device using the rod for confirming the adjustment of headlamp optical axis according to the aforementioned embodiment of the present invention is intended for confirmation of the horizontal adjustment of the optical axis. This device may be adopted in place of the device 107 using a level for confirming the vertical adjustment of optical axis.

What is claimed is:

1. A device for confirming adjustment of an optical axis of an automotive headlamp, the headlamp including a lamp housing, a reflector movably mounted inside the lamp housing and adjusting means for adjusting the optical axis of the lamp by moving the reflector with respect to the lamp housing, the device comprising:
a tubular case open at a first end thereof and closed at a second end thereof and being comprised of a transparent material through which an inside of the case can be viewed, the case being fixed to the lamp housing such that a portion of the first end of the case is located inside the lamp housing, the case including an index mark near the second end of the case;

a rod having a first end attached to the reflector and a second end having a scale marked thereon, the rod being inserted into the case through the first end of the case, the scale being aligned with the index mark such that a displacement of the rod caused by a movement of the reflector changes a relative position of the index mark to indicate an adjustment of the optical axis of the headlamp; and a protective cover having an open end and being fixed to the lamp housing at the open end so as to cover at least the case and the rod, the protective cover including a viewing window to view the index mark and the scale and a lighting window formed opposite the viewing window.

2. A device according to claim 1, wherein the case is movably mounted to the lamp housing so as to be movable in the axial direction of the rod such that the relative position of the index mark on the case and the scale on the rod can be initially set.

3. A device according to claim 2, wherein the rod is made of a material such that an axial length of the rod is substantially constant for any temperature change and the rod has an appropriate elasticity.

4. A device according to 1, wherein the rod is made of a material such that an axial length of the rod is substantially constant for any temperature change and the rod has an appropriate elasticity.

5. A device according to claim 1, wherein the case, the rod and the protective cover are provided near the adjusting means on the headlamp.

* * * * *